(12) United States Patent
Sasaki et al.

(10) Patent No.: US 7,259,754 B2
(45) Date of Patent: Aug. 21, 2007

(54) PEN SENSOR COORDINATE NARROWING METHOD AND APPARATUS

(75) Inventors: Manabu Sasaki, Kawasaki (JP); Takatoshi Fukuda, Kawasaki (JP); Manabu Suzuki, Kawasaki (JP); Kunihiko Hagiwara, Kawasaki (JP); Yukihiro Okada, Longmont, CO (US); Hiroshi Miyaoku, Kawasaki (JP); Seiji Toda, Kawasaki (JP); Keiko Horiuchi, Adachi (JP)

(73) Assignee: Fujitsu Limited, Kawasaki (JP)

( * ) Notice: Subject to any disclaimer, the term of this patent is extended or adjusted under 35 U.S.C. 154(b) by 41 days.

(21) Appl. No.: 10/179,031

(22) Filed: Jun. 26, 2002

(65) Prior Publication Data
US 2003/0095109 A1    May 22, 2003

Related U.S. Application Data

(63) Continuation of application No. PCT/JP99/07425, filed on Dec. 28, 1999.

(30) Foreign Application Priority Data
Dec. 28, 1999  (WO) .................. PCT/JP99/07425

(51) Int. Cl.
*G09G 5/00* (2006.01)
(52) U.S. Cl. ..................... 345/179; 345/182
(58) Field of Classification Search ............... 345/173, 345/177, 179, 180, 181, 182, 183
See application file for complete search history.

(56) References Cited

U.S. PATENT DOCUMENTS 5,357,266 A * 10/1994 Tagawa ................ 345/173
5,684,505 A   11/1997 Takita et al.
6,239,789 B1 * 5/2001 Sekizawa et al. .......... 345/173
6,259,437 B1   7/2001 Onodaka et al.
6,377,249 B1 * 4/2002 Mumford .................. 345/179

FOREIGN PATENT DOCUMENTS

JP    58-82330    5/1983

(Continued)

OTHER PUBLICATIONS

PCT Written Opinion with translation. Sep. 19, 2000.

(Continued)

*Primary Examiner*—Richard Hjerpe
*Assistant Examiner*—Jean Lesperance
(74) *Attorney, Agent, or Firm*—Staas & Halsey LLP

(57) ABSTRACT

When a user indicates a point on a display screen of a computer using a pen sensor, first the display screen is divided into a plurality of areas and the areas are displayed by mutually different colors or brightnesses. The plurality of colors or brightnesses displayed are scanned by the pen sensor and the colors or brightnesses detected by the light receiver to judge in which area the indicated point is located. Next, the judged area is further divided into a plurality of areas which are displayed by mutually different colors or brightnesses. Next, a routine similar to the above is successively repeated to narrow down the area in which the point indicated by the pen sensor is located and finally determine the position of the point, that is, the XY coordinates on the display screen.

21 Claims, 15 Drawing Sheets

FOREIGN PATENT DOCUMENTS

| | | |
|---|---|---|
| JP | 58-127274 | 7/1983 |
| JP | 58-190990 | 11/1983 |
| JP | 60-24619 | 2/1985 |
| JP | 63-24619 | 7/1985 |
| JP | 61-157930 | 7/1986 |
| JP | 62-235629 | 10/1987 |
| JP | 1-286014 | 11/1989 |
| JP | 6-187087 | 7/1994 |
| JP | 7-64703 | 3/1995 |
| JP | 7-141104 | 6/1995 |
| JP | 7-1411104 | 6/1995 |
| JP | 8-63288 | 3/1996 |
| JP | 2000-20237 | 1/2000 |

OTHER PUBLICATIONS

Japanese Office Action for JP 2001-549175, dated Aug. 1, 2006.

* cited by examiner

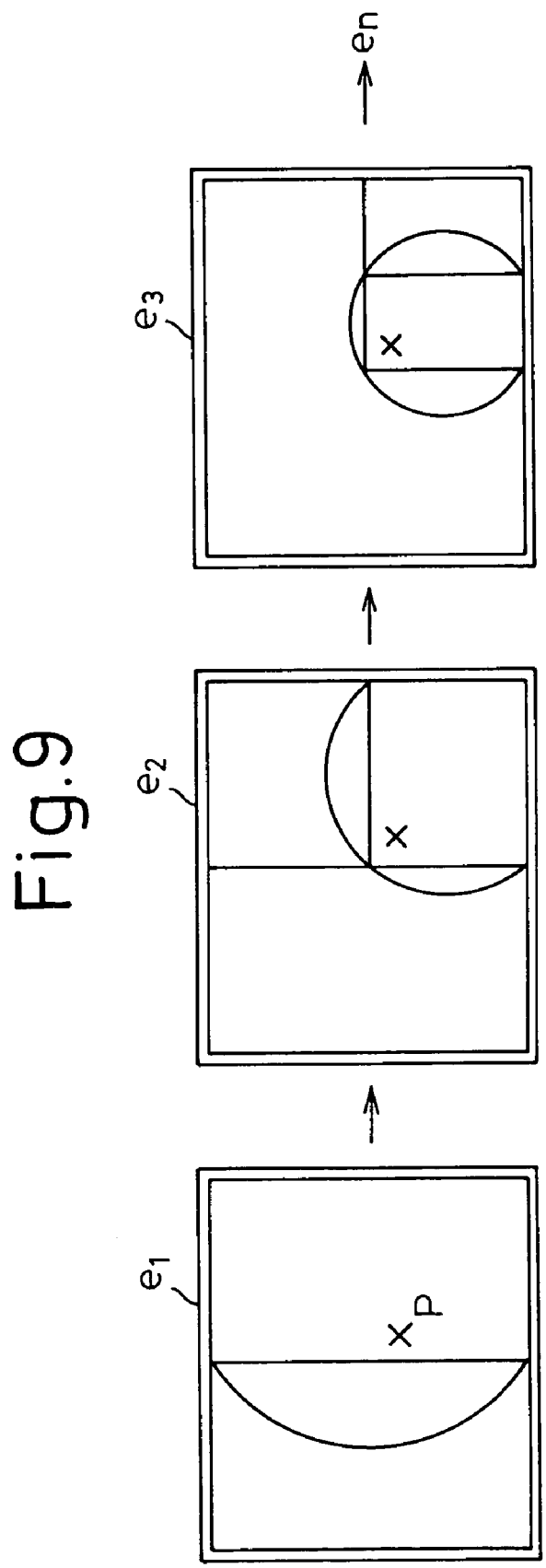

ND APPARATUS

PEN SENSOR COORDINATE NARROWING METHOD AND APPARATUS

CROSS-REFERENCE TO RELATED APPLICATION

This application is a continuation application and is based upon PCT/JP99/07425, Dec. 28, 1999.

TECHNICAL FIELD OF THE INVENTION

The present invention relates to a pen sensor coordinate narrowing method and apparatus enabling highly accurate determination of the XY-coordinates of a point of contact on a screen of a display device of a computer etc. when bringing a pen sensor into direct contact with the screen.

BACKGROUND RELATED ART

At the present time, there are various types of input devices for conveying the intention of a user to a computer. For example, generally data etc. is input using a keyboard. In addition, there are also voice-activated input devices, but there are limits to the accuracy of voice recognition and these are not yet in broad use.

These input devices, however, mainly input data relating to text data. It is often also necessary to input graphic data. Further, when inputting graphic data, sometimes the data is input while drawing it. As the input devices used for this, tablets are the mainstream.

Such a tablet will be explained with reference to FIG. 16.

A tablet, like a keyboard or a mouse, is connected to a computer. When the tracing a figure on a screen 101 provided at the tablet by the tip of a pen housing a coil etc., the coordinates of the points traced by the tip of the pen are detected and the coordinate data sent to the computer. The display screen of the computer displays the path of the points traced in accordance with display positions based on the coordinate data.

Conductor patterns 103 are laid in a matrix on the screen 101 of the tablet. A Y-coordinate scan circuit 104 and an X-coordinate scan circuit 105 are provided for determining the coordinates of the pen 102 from the voltage generated at the conductor patterns 103. The pen 102 attached for tracing a figure on the screen 102 houses a coil for generating an electromagnetic wave.

When a user moves the tip of the pen 102 on the screen 101, an electromagnetic wave is generated from the coil in the pen 102 and an electromotive force is generated by Faraday's law of electromagnetic induction at the conductor patterns 103. The Y-coordinate scan circuit 104 and the X-coordinate scan circuit 105 find the positions of the coordinates relating to the tip of the pen 102 based on the electromotive force generated in the conductor patterns 103.

A tablet is configured separate from the computer. As another type of input device, however, there is a touch panel built into the display screen of a computer. FIG. 17 shows the configuration of this touch panel.

The touch panel 111 is placed on the display screen of the computer by adhesion etc. The touch panel 111 is formed with a large number of transparent switches $SW_{mn}$ in a matrix. These are arranged so that the coordinates of the display screen of the computer and the coordinates of the touch panel 111 match.

When a user presses any position of the touch panel 11 by his or her finger, a pen, etc., the switch $SW_{mn}$ at the pressed location closes. An X-coordinate switching detection driver 112 and Y-coordinate switching detection driver 113 can detect the closed state of the switch $SW_{mn}$ so as to specify the XY coordinates of the pressed point.

While there are input devices configured like the above, figures are mainly drawn using tablets, while simple selection operations etc. are performed using touch panels.

A touch panel is either adhered to the display screen of a display device or placed in a state covering the screen, so is made thin. With a touch panel, the cost rises the larger the screen. Further, it has to be installed on the display device, so the visibility of the display information is impaired. Further, the panel is directly pressed by the finger, pen, etc., so is easily damaged or deteriorated.

On the other hand, a tablet comprises a board shaped like a mouse pad in which is built conductor patterns, scan circuits, and other coordinate detection devices and uses a pen instead of a mouse. With a tablet, the coordinates on the display screen of the computer and the coordinates on the tablet have to be matched. The work for matching them is performed by the user. This work requires considerable technical skill and experience.

Further, in recent years, tablets have been built in at the back side of LCD panels to allow intuitive use like with a touch panel. Since these are built-in types, however, it is not possible to add this function to existing hardware. Further, when building in a tablet, it is necessary to match the coordinates on the display device and the coordinates on the tablet. Further, the tablet itself has to be made thin in order not to detract from the paramount feature of LCDs—their thinness. In this way, a high manufacturing technology is demanded and the cost become high.

Therefore, an input device which enables intuitive input work on a display screen and can be added even to existing computer hardware is sought. Further, an input device which enables easy determination of coordinates relating to a point indicated on a display screen is required.

DISCLOSURE OF INVENTION

To solve the above problem, the present invention provides a pen sensor coordinate narrowing method and a narrowing apparatus in a pen sensor input device for a computer having a pen sensor having a light receiver able to detect two or more colors or brightnesses and having a display device able to display the two or more colors or brightnesses distinguished from each other, whereby determination of the coordinate position of a point indicated by the pen sensor can be simply performed.

This pen sensor input device starts a scan operation only when detecting that the user has indicated a point on the display screen by that pen sensor. In this scan operation, first, the screen is divided into a plurality of areas and different colors or brightnesses are displayed for the areas. The displayed plurality of colors or brightnesses are scanned by the pen sensor and the colors or brightnesses detected by the light receiver are used to find in which area the point indicated by the pen sensor is located. Next, the found area is further divided into a plurality of areas which are again displayed by mutually different colors or brightnesses. At this time, the colors or brightnesses detected by the light receiver are used to find in which area the point is located. By successively subdividing the areas into a plurality of areas and repeating this work, the area in which the point indicated by the pen sensor is located is narrowed down until finally determining the positional information of that point, that is, the XY coordinates on the display screen.

Further, when scanning a plurality of points by the pen sensor, the direction of movement of the pen sensor is predicted or detected for the division of area and scan operation of the second point on. The division of area and scan operation are started from this predicted or detected area to shorten the time required for determination of the XY coordinates of the point indicated by the pen sensor for the second point on.

According to the present invention, a pen sensor for detecting the color or brightness relating to a coordinate position on a display screen of a display device is used to narrow down the area in which a point indicated by a pen sensor is located and determine its coordinates, so addition of the function to existing hardware is easy, the reliability is high, visibility is not impaired, and coordinate positions can be determined with a high accuracy at a low cost.

BRIEF DESCRIPTION OF DRAWINGS

FIG. 9 is a schematic view of a display screen displaying division of areas with emphasis.

BEST MODE FOR CARRYING OUT THE INVENTION

To clarify the effects brought about by the present invention, first, coordinate positioning by a pen sensor (light pen) not based on the present invention will be explained.

Figure 1:
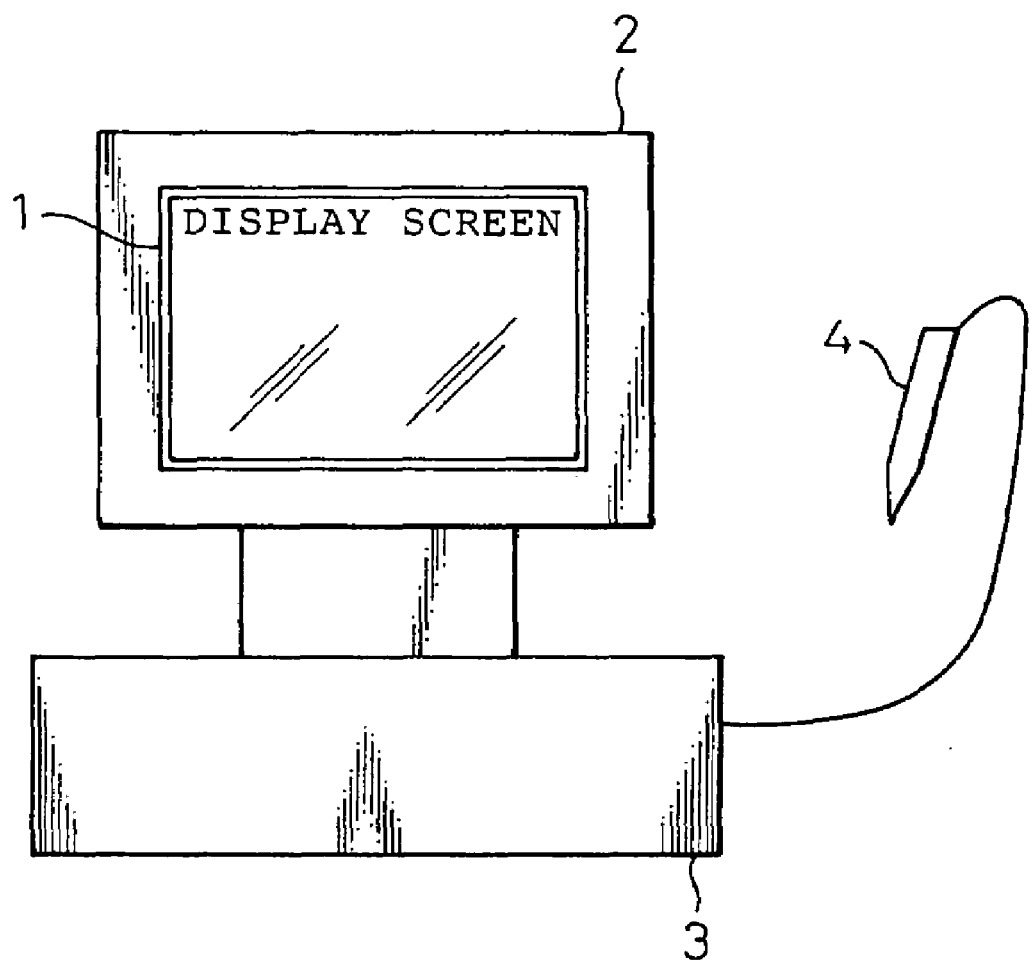
FIG. 1 is a schematic view of the configuration of a pen sensor input device.

FIG. 1 shows an input device using a pen sensor in a computer system. This computer system is comprised of a display device 2 having a display screen 1 of a cathode ray tube (CRT) and a computer 3 having a keyboard or other input device. Further, a pen sensor 4 is connected to the computer, that is, control system device 3, through a cable as an input device.

Figure 2:
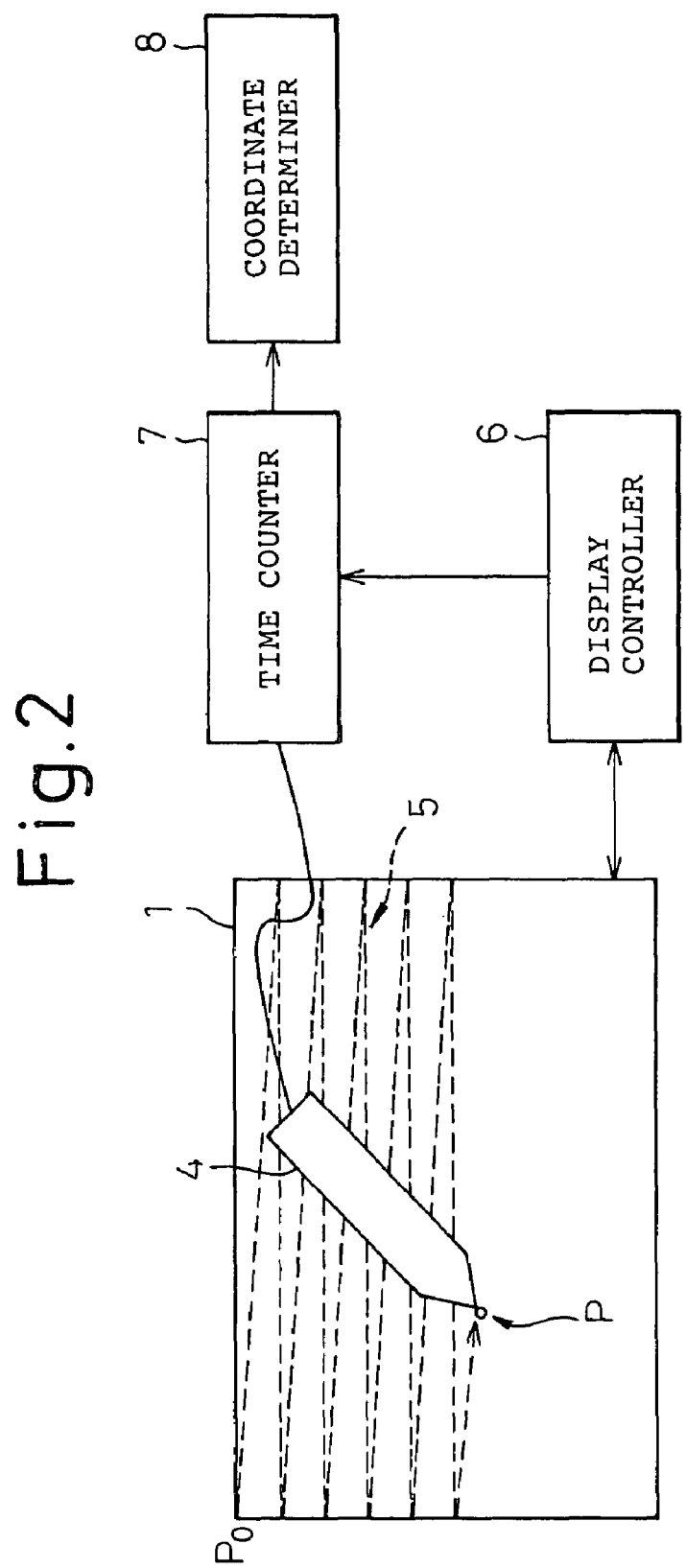
FIG. 2 is a schematic view of a pen sensor input device in a CRT display device.

How the coordinate position is determined when the pen sensor 4 is placed on the display screen when drawing using the pen sensor 4 by a computer system having a pen sensor 4 connected to it as an input device will be explained with reference to FIG. 2. In FIG. 2, portions the same as in FIG. 1 are indicated by the same reference numerals.

The display screen 1 is driven by a display controller 6 built into the control system device 3 and displays the results of processing by the computer etc. For the display, an electron beam is raster scanned from the top left point $P_0$ of the display screen 1. The scan path is shown by the broken lines in FIG. 2.

Here, when trying to draw using this computer system, the user brings the tip of the pen sensor 4 into contact with the screen 1 of the CRT to indicate the starting point of drawing on the screen 1. The tip of the pen sensor 4 is provided with a light receiving sensor. This light receiving sensor can sense changes in the light on the screen 1, so can sense the difference in brightness of a point contacted by the tip of the pen sensor on the screen 1.

Normally, when using a CRT for display, the raster scan of the entire screen from the point $P_0$ of the screen 1 is repeated every predetermined time period. The state of the tip of the pen sensor 4 in contact with the display screen 1 in a screen displayed repeatedly in this way is shown in FIG. 2.

When the tip of the pen sensor 4 contacts the point P on the display screen 1, the scan path 5 reaches from the point $P_0$ to the point P on the screen 1. When this happens, the light receiving sensor at the tip of the pen sensor 4 detects the light. At this time, if it is possible to learn the time the electron beam takes to reach from the point $P_0$ to the point P, then it would be possible to find the distance scanned by the electron beam from point $P_0$.

Therefore, the display controller 6 transmits the time the electron beam started scanning from the point $P_0$ to a time counter 7. Further, when light is detected by the light receiving sensor of the pen sensor 4, that detection signal is sent to the time counter 7, so the time counter 7 counts the time by which the electron beam moves from the point $P_0$ to the point P.

The coordinate determiner 8 can calculate the distance of the point P from the point $P_0$ based on the counted time sent from the time counter 7. The size of the display screen 1 and the number of scan lines for scanning the entire screen are both known, so it is possible to determine that position as the XY coordinates. Here, the X-axis indicates the horizontal direction of the screen, while the Y-axis indicates the vertical direction.

Note that when the point P is moving such as when drawing a figure, the coordinate position of the point P is determined by counting the time of movement from the point $P_0$ to the point P each time for each repeated screen. Further, the light receiving sensor of the pen sensor 4 was explained as one detecting light of different brightnesses, but the light receiving sensor may also detect specific colors.

The pen tip coordinate position determination method using a pen sensor described above, however, is based on the principle of finding the scanning time of an electron beam, so can only be applied to the display screen of a CRT. This method cannot be used for a display device using a liquid crystal display (LCD), that is, a different display system from a CRT.

Therefore, the present invention makes it possible to later add an input device enabling input on a display screen of a computer system and determine the coordinate position of an indicated point on the screen simply even by a display system using an LCD.

Embodiments of the present invention will be explained next using the drawings.

Figure 3:
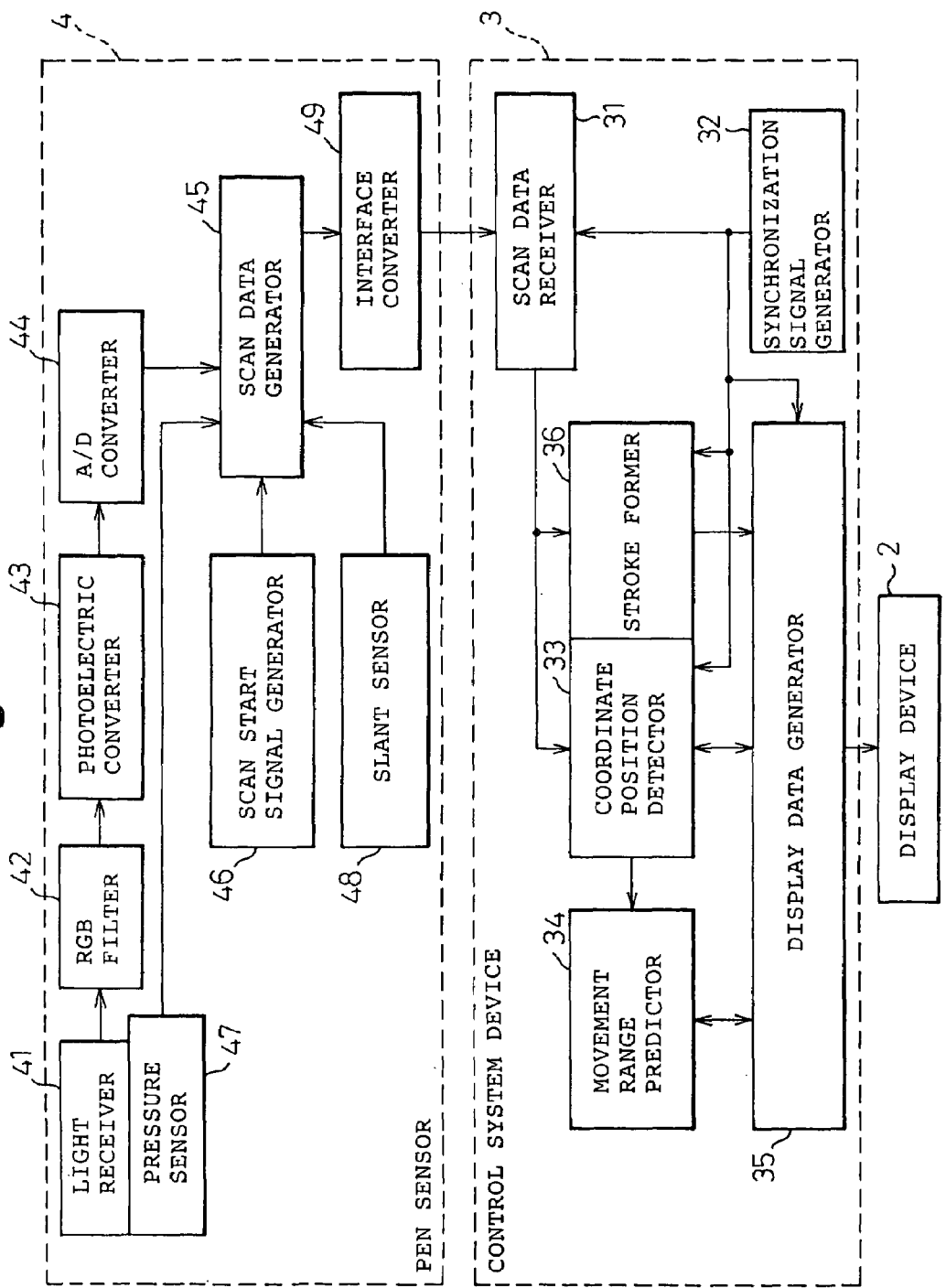
FIG. 3 is a view of the detailed block configuration of a pen sensor input device according to the present invention.

The schematic configuration of the input device used in the embodiments is similar to that shown in FIG. 1, but the display screen 1 of the display device 2 is an LCD. The detailed block configuration of the input device is shown in FIG. 3. In FIG. 1, portions the same as in FIG. 1 are assigned the same reference numerals.

The pen sensor 4 has a light receiver 41, an RCB filter 42, a photoelectric converter 43, a scan data generator 45, a scan start signal generator 46, and an interface converter 49.

The light receiver 41 is provided at the tip of the pen sensor 4 and detects the light of any point on the screen indicated on the display screen 1. The RCB filter 42 splits the light detected by the light receiver 41 into color components of the three primary colors. The photoelectric converter 43 converts the split three colors of light into voltage signals. These voltage signals become values corresponding to the colors of the light. Further, these voltage signals are converted to digital signals by an A/D converter 44 and sent to a scan data generator 45. The scan data generator 45 sends the digital signals corresponding to the three colors of light from the A/D converter to the interface converter 49 based on the scan signal expressing the scan state transmitted from the scan signal generator 46. The interface converter 49 is an interface for transmitting signals to the control system device 3.

Here, if the information on the display screen 1 detected by the light receiver 41 is only brightness, the RCB filter 42 is not necessary. When detecting both color and brightness, the balance of the voltage values corresponding to the three color components are used for judgement.

Further, the scan signal from the scan start signal generator 46 may be generated by a button or switch provided at the pen sensor 4 itself or the keyboard, mouse, or other location. Further, it is also possible to detect the contact of the tip of the pen sensor 4 on the display screen 1 to generate the scan start signal as with a pressure sensor 47 provided at the tip of the pen sensor 4 etc. The scan start signal generator 46 supplies a signal showing the scan state to the scan data generator 45 while desiring to scan the display screen 1 by the pen sensor 4 when the button etc. is pressed.

Note that the pen pressure sensor 47 and slant sensor 48 are provided to add the function of detecting the state of pressing the pen sensor 4 to the display screen 1 to express the pressure and the function of detecting the slant of the pen sensor to give a brush-like stroke. These sensor outputs are sent to the scan data generator 45 and sent to the control system device 3 as scan data. Therefore, when using the pen sensor 4 as a pointing device, the sensors 47 and 48 are unnecessary.

On the other hand, the control system device 3 has a scan data receiver 31, synchronization signal generator 32, coordinate position detector 33, movement range predictor 34, and display data generator 35.

The scan data receiver 31 receives the scan data sent from the interface converter 49 of the pen sensor 4 and supplies that scan data to the coordinate position detector 33. The synchronization signal generator 32 not only generates a synchronization signal of the display data supplied to the display screen 1, but also outputs the synchronization signal serving as a reference signal to the scan data receiver 31 and coordinate position detector 33. Further, the coordinate position detector 33, details of which will be explained later, synchronizes by the synchronization signal and compares the scan data and the display data from the display data generator 35 and determines the position which the tip of the pen sensor 4 indicates on the display screen as coordinates.

When the position is determined, the coordinate position detector 33 activates the movement range predictor 34 and supplies the found coordinate position data. The movement range predictor 34 predicts the movement range of the tip of the pen sensor 4 based on the coordinate position data and the display data.

The display data generator 35 generates display data of the image to be displayed by the computer system and adjusts the prediction data from the movement range predictor 34 and the coordinate position data from the coordinate position detector 33 to generate display data synchronized with the synchronization signal. The generated display data is supplied to the display device and displayed on the display screen.

Note that the control system device 3 is also provided with a stroke former 36. It receives the pressure signal from the pressure sensor 47 of the pen sensor 4 and the slant signal from the slant sensor 48 and generates the stroke data. Further, the stroke data is supplied to the display data generator 35 where the display data supplied to the display device 2 is generated together with the other coordinate position data and prediction data. The generation of this stroke data is an additional function in the present embodiment.

Next, the coordinate narrowing operation for determining the position of the tip of the pen sensor 4 in the present embodiment will be explained by giving a specific example referring to FIG. 4 to FIG. 7.

Figure 4:
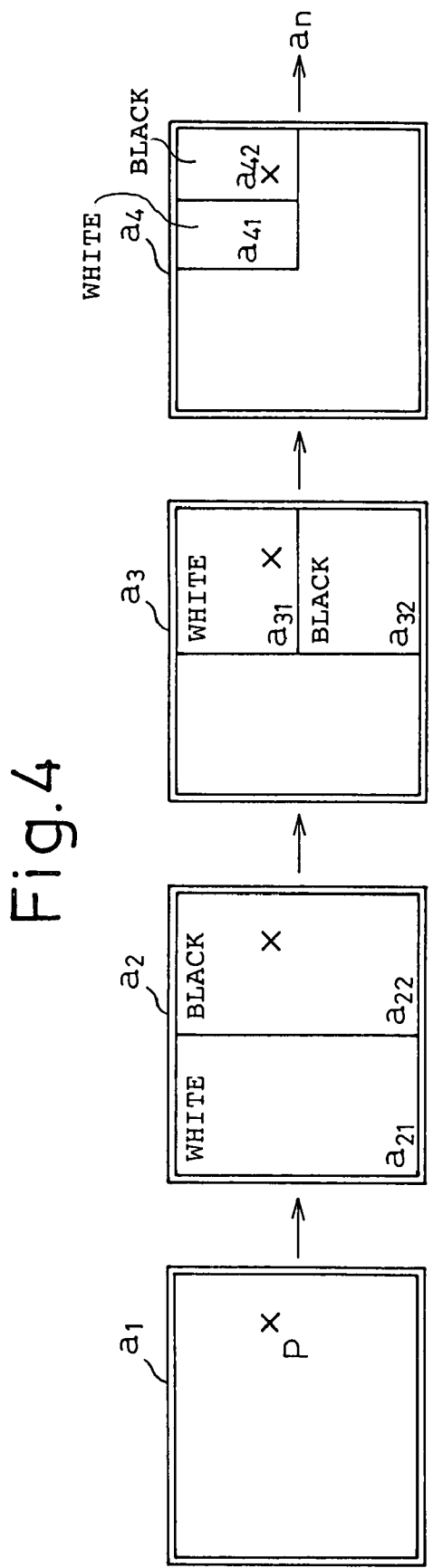
FIG. 4 is a schematic view of a coordinate narrowing operation by a screen divided into two areas.

In FIG. 4, the double line shows the display screen 1. Frames of the screen are shown by $a_1, a_2, \ldots, a_n$.

First, the position (x mark) indicated in the frame $a_1$ by bringing the tip of the pen sensor 4 into contact with the screen is shown by the point P. Assume that the user leaves the tip of the pen sensor 4 in contact with the screen. Further, when the tip of the pen sensor 4 is brought into contact with the screen, the user inputs the start of the scan by the pen sensor 4 by a button etc.

When such a start signal is input, first, as a first step, the frame $a_1$ is divided into the two areas $a_{21}$ and $a_{22}$. At this time, the area $a_{21}$ is displayed as white and the area $a_{22}$ as black using differences of brightness. The point P indicated by the tip of the pen sensor 4 is located in the black area $a_{22}$ in the frame $a_2$. Here, if the light receiver detects black, it can be judged that the tip of the pen sensor 4 is located in the black area, that is, is located in the area $a_{22}$ at the right half of the frame $a_2$.

By learning that the tip of the pen sensor 4 is located in the right half area $a_{22}$, the area $a_{22}$ is divided into the area $a_{31}$ and area $a_{32}$ as in the frame $a_3$ and the area $a_{31}$ is displayed as white and the area $a_{32}$ as black. This time the point P is located in the white area $a_{31}$, so when the light receiver 41 detects white, it is learned that the point P is located in the top right area $a_{31}$ of the frame $a_3$.

Next, if the area $a_{31}$ is divided into the white area $a_{41}$ and the black area $a_{42}$, since the point P is located in the area $a_{42}$, the light receiver 41 detects black and it is learned that the position P is located in the area $a_{42}$.

Similarly, by successively dividing areas where it is learned the point P is present into two white and black areas and repeating this to finally the frame $a_n$ so that the area becomes the smallest unit of the image display, the area in which the point P is located is narrowed down and the coordinate position of the point P is determined.

Note that when dividing an area into two, the white and black may be displayed by any arrangement. As the method of division as well, it is possible to start from the horizontal to vertical or vertical to horizontal. Further, while the case of display divided into white and black was shown, it is also possible to divided into two and display the areas by specific colors or brightness.

Here, when determining the coordinate position of the point P by the white and black repeat routine shown in FIG. 4, since the tip of the pen sensor 4 is brought into contact on the screen for scanning during the display of the image, n frames worth of time, though short, from when the tip is brought into contact with the screen to where the coordinate position can be determined, is required. During this time, the white and black areas are repeatedly displayed on the display screen 1.

To keep the white and black area display as unnoticeable as possible, it is possible to leave the divided white and black areas in each frame and return the other display portions to the original display image.

The time required for determination of the XY coordinates of the position indicated by the pen sensor 4 will be explained next.

When the resolution of the LCD constituting the display screen of the display device 1 is 1024×768 dots, the coordinates are determined by narrowing them down to finally one dot at the position indicted by the pen sensor 4. As explained above, if narrowing down the coordinates while dividing the areas into two, since $1024=2^{10}$, 10 two-way divisions each are required for the X-coordinate and Y-coordinate. A total scan refresh rate of 20 is required. This being the case, if there are 60 frames of an image per second, the time for determination of the XY coordinates becomes $\frac{1}{3}$ second.

In actuality, the tip of the pen sensor 4 has a certain area and is larger than one dot of the LCD, so it is possible to reduce the number of two-way divisions. After narrowing down the coordinates to the area of the tip, if when desiring to determine the coordinates down to a single dot, it is possible to compute the center point of the area of the tip to find them.

With the above embodiment using two-way division, however, sometimes the coordinate narrowing time for determining the XY coordinates is too slow such as when drawing a figure. Therefore, an embodiment reducing the coordinate narrowing time will be explained next.

This embodiment will be explained with reference to FIG. 5.

Figure 5:
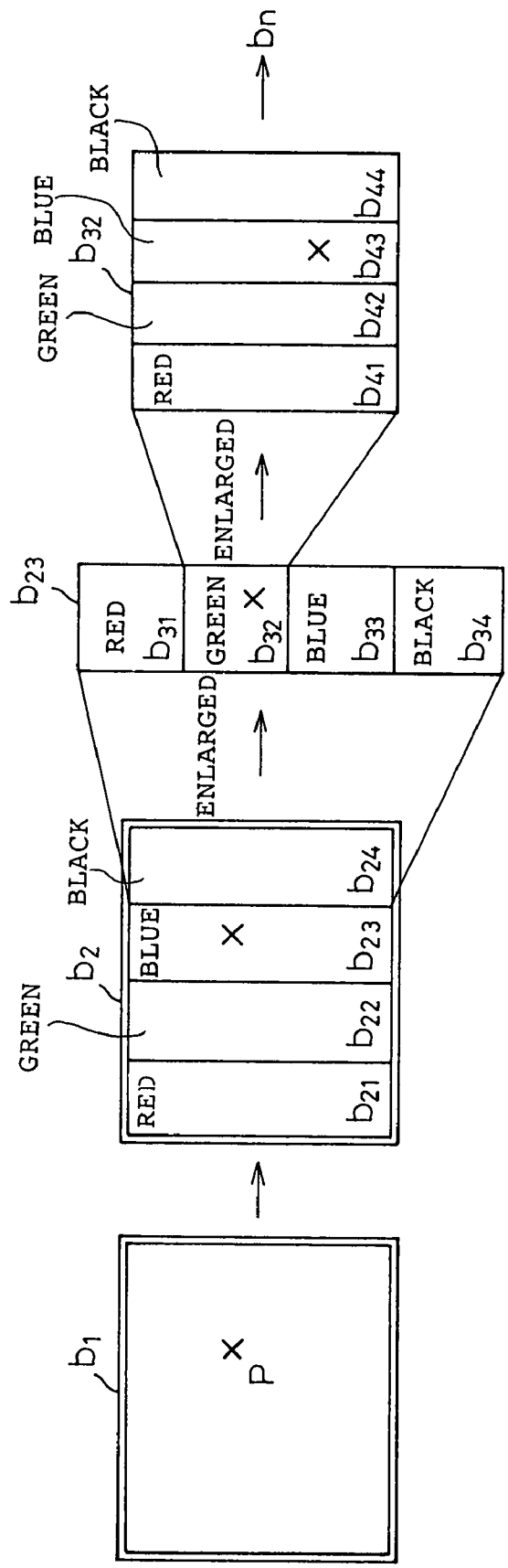
FIG. 5 is a schematic view of a coordinate narrow operation by a screen divided into four areas.

In the embodiment shown in FIG. 4, the XY coordinates were determined by dividing an area of the screen into two, but in the embodiment of FIG. 5, the fact that the light receiver 41 of the pen sensor 4 is a color sensor is utilized to select four colors and divide an area on the screen into four.

At the frame $b_1$, the tip of the pen sensor 4 indicates the point P (x mark). At the next frame $b_2$, the screen of the frame $b_2$ is divided into four and the areas $b_{21}$ to $b_{24}$ are displayed. In FIG. 5, the screen is divided across the horizontal direction to obtain vertically long areas. These are displayed as red, green, blue, and black from the left. The colors need only be selected to be different from each other. It is possible to use any four colors or four levels of brightness.

The light receiver 41 of the pen sensor 4 detects blue. This shows that the point P is located in the area $b_{23}$, so in the next frame $b_3$, the area $b_{23}$ is divided into four across the vertical direction and the areas $b_{31}$ to $b_{34}$ are displayed. At this time, the four colors displayed may be the same as the frame $b_2$. Any arrangement of the colors is also possible. Note that in FIG. 5, the area $b_{23}$ is shown enlarged.

Here, the light receiver 41 of the pen sensor 4 detects green. Due to this, it is learned that the point P is located in the area $b_{32}$, so at the next frame, the area $b_{32}$ is further divided into four and the areas $b_{41}$ to $b_{44}$ are displayed.

In this way, it is possible to determine the coordinates of the position of the point P by successive narrowing operations using the color detection signals of the light receiver 41 of the pen sensor 4 at successive frames. If under the above conditions, since $1024=4^5$, the areas are divided five times each for the X-coordinate and the Y-coordinate. The narrowing time in the present embodiment is two times faster than the case of the embodiment of two-way division.

Figure 6:
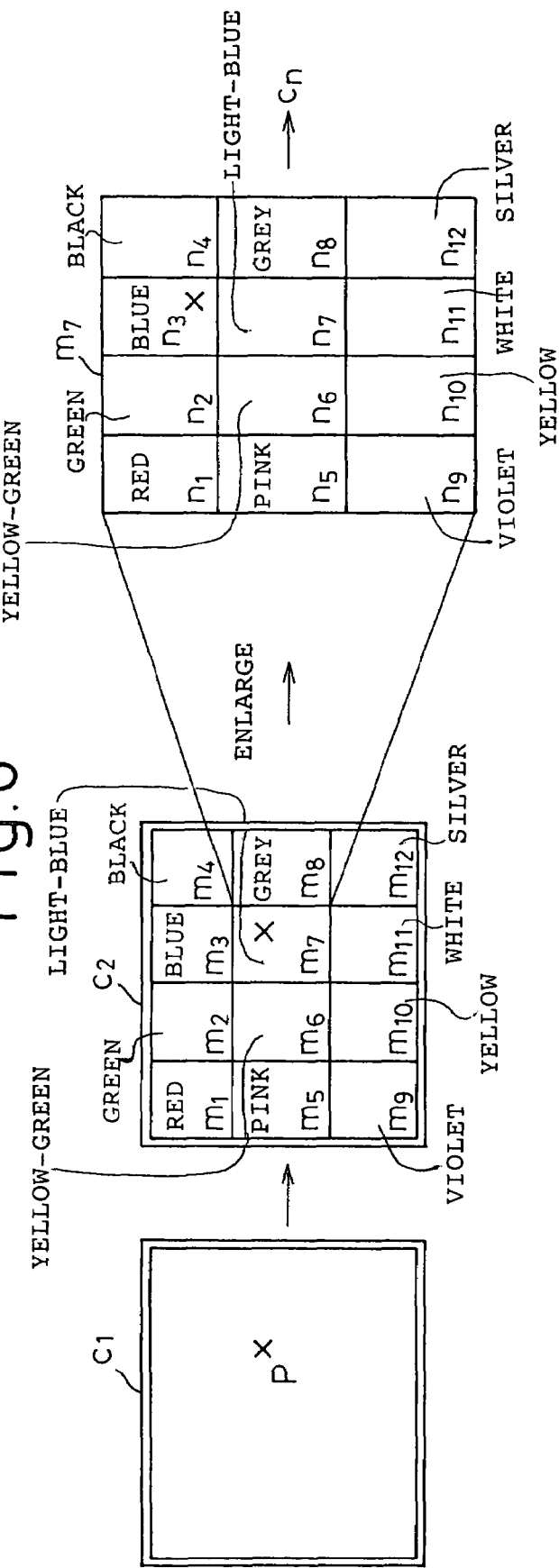
FIG. 6 is a schematic view of a coordinate narrowing operation by a screen divided into 12 areas.

Further, an embodiment for speeding up the narrowing time will be explained with reference to FIG. 6.

At frame $c_1$, assume that the tip of the pen sensor 4 indicates the point P (x mark). At the next frame $c_2$, the screen of the frame $c_1$ is divided into 12 and the areas 1 to 12 are displayed. At FIG. 6, the screen is divided across the horizontal direction and across the vertical direction into areas which are displayed colored from red to silver in 12 different colors as illustrated.

The colors need only be selected to be different from each other and may be any colors. It is also possible to select and combine different levels of brightness. Further, the number into which the areas are divided is not limited to 12. It is also possible to change the number divided by in a frame in the middle. Further, it is possible to use gradations for the brightness or colors and possible to combine several types of divisions.

The routine for narrowing down the coordinates shown in this embodiment is similar to the embodiment shown in FIG. 5. The narrowing time, however, is much faster. The scan refresh rate is 6. Under similar conditions to the above, the time becomes 0.1 second. Further, by suitably selecting the number divided by or combining gradations, it is possible to further shorten the time.

An embodiment for determining the XY coordinates more efficiently than the embodiments explained above will be explained next referring to FIG. 7. In the embodiments shown from FIG. 4 to FIG. 6, the screen was divided across the X-coordinate direction and across the Y-coordinate direction and a plurality of areas displayed. As explained above, the scan refresh rate is determined by the number divided by in both the X-coordinate direction and the Y-coordinate direction, so if able to reduce the number divided by in the Y-coordinate direction, the XY coordinates can be determined more efficiently.

Figure 7:
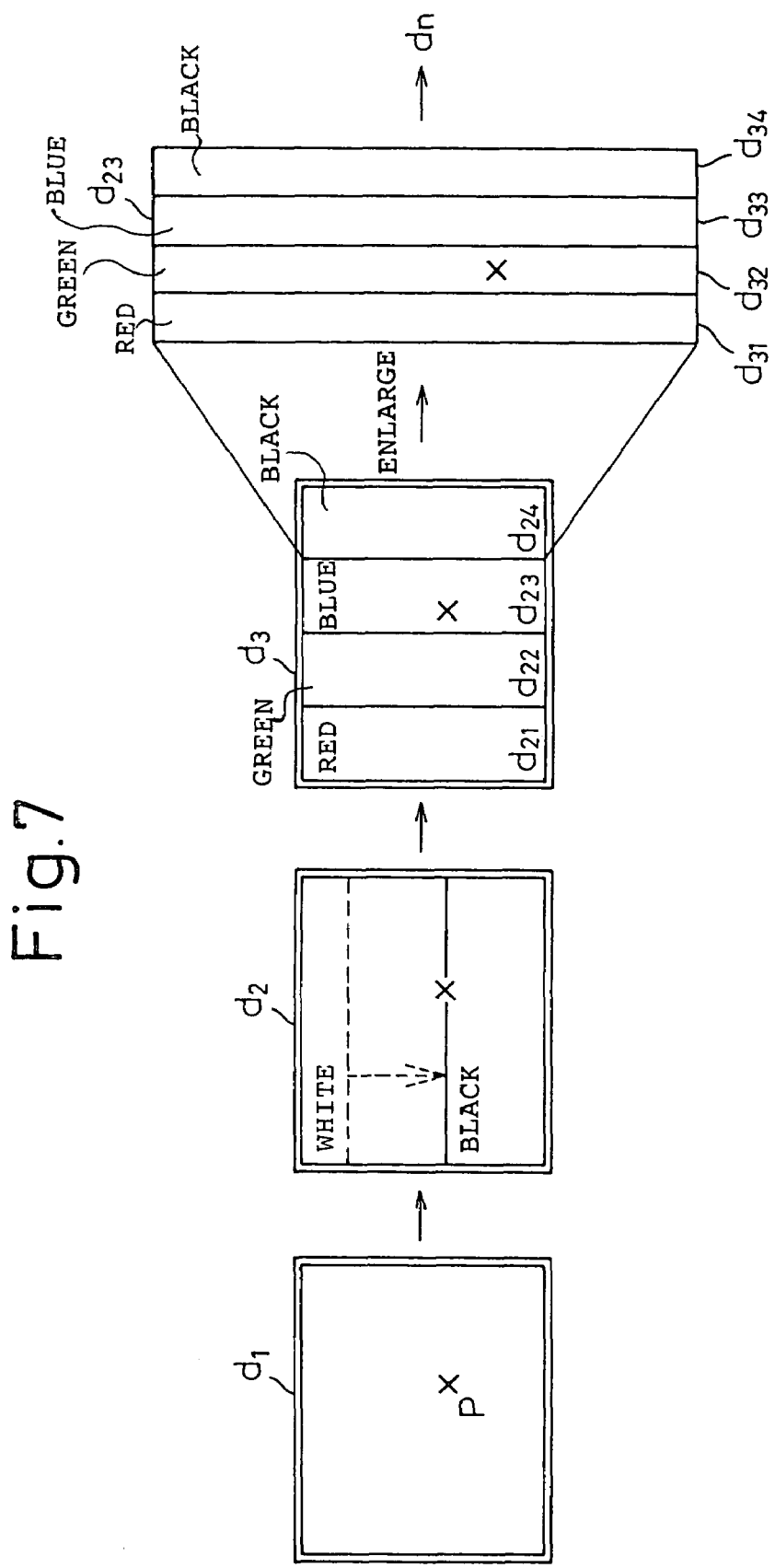
FIG. 7 is a schematic view of a coordinate narrowing operation by movement of a boundary line dividing two areas.

In FIG. 7, in frame $d_1$ of the screen, the tip of the pen sensor 4 is assumed to indicate the point P (x mark). Here, in the same frame, the screen is changed from white to black every other line to increase the white areas from the top of the screen (in the figure, shown by the dotted line arrow). In FIG. 7, the boundary line between white and black on the screen is shown by a horizontal solid line, but when this boundary line reaches the point P, the light receiver 41 of the pen sensor 4 detecting black up to then detects white. The position which the boundary line moves to is known at the display data generator 35 of the control system device 3, so detection of white from black by the light receiver 41 means the position of the Y-coordinate could be determined at that time.

Here, since the position of the Y-coordinate is determined, it is sufficient to determine the position of the X-coordinate in the next frame on. At the next frame $d_2$, the screen is divided into four across the X-coordinate direction and the different color areas $d_{21}$ to $d_{24}$ are displayed. The point P is in the blue area $d_{23}$, so the light receiver 41 detects blue and it is learned that the point P is in the area $d_{23}$.

At the next frame, the area $d_{23}$ in which the point P is located is divided further into four across the X-coordinate direction and the different color areas $d_{31}$ to $d_{34}$ are displayed. Here, if the light receiver 41 detects green, it is learned that the point P is located in the area $d_{32}$. Similarly, in the successive frames, the areas can be divided into four across the X-coordinate direction so as to determine the position of the X-coordinate.

Note that at the frame $d_1$, the invention is not limited to white and black. It is also possible to use colors or brightnesses enabling differentiation of the boundaries. Further, from the frame $d_2$ on, the invention is not limited to four-way division. It is also possible to use colors or brightnesses for any number of divided areas. Further, if the areas other than the area being divided are returned to the original normal display screen, the work for determination of the coordinates on the display screen will not be so noticeable.

In the embodiment of FIG. 7, the boundary line between white and black is moved from the top of the screen in the Y-coordinate direction. However, the boundary line may be moved from the bottom of the screen in the same way as for the case from the top.

Further, in the embodiment of FIG. 7, the technique was employed of moving the boundary line in just the Y-coordinate direction and dividing areas across the X-coordinate direction, but if the coordinate position is determined by moving of the boundary line by different colors or brightnesses for the X-coordinate direction as well in the same way as for the Y-coordinate direction, it is possible to improve the efficiency more and shorten the time.

Up to here, in the embodiments shown from FIG. 4 to FIG. 7, the explanation was made of the coordinate narrowing routine for determination of the coordinate position. Next, however, the explanation will be made, with reference to FIG. 8A to FIG. 8C, of the accuracy when judging which area a point is located in when the light receiver 41 of the pen sensor 4 detects color or brightness displayed on the screen.

The accuracy of the scan area of the pen sensor 4 depends on the detection accuracy of the light receiver 41. The smallest unit of determination of the XY coordinate position on a display screen is one LCD pixel, so if the light receiver 41 can detect down to one dot, the accuracy is maximum.

Figure 8A:
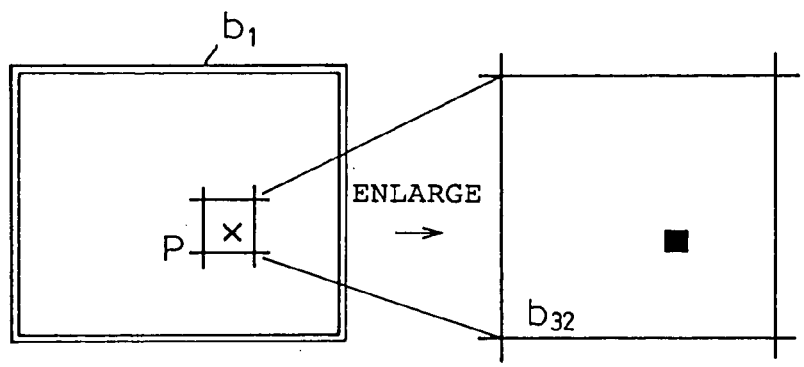
FIGS. 8A to 8C are schematic views for explaining a scan operation by a plurality of dots.

FIG. 8A shows the case of judgement of the presence of a point P taking as an example the area $b_{23}$ of FIG. 5. Here, at the position of the point P, the sensor of the light receiver 41 can detect the color or brightness of that one dot. The dot for which the XY coordinates are to be actually found is shown by the square black dot in the area $b_{32}$. The area $b_{32}$ is displayed by the same color or brightness in this area.

When the sensor of the light receiver 41 detects the color or brightness of only one dot in this way, however, for example, if part of the pixels are missing or there are other abnormalities in the LCD screen or if dirt adheres to the screen, if the tip of the pen sensor 4 happens to indicate an abnormal dot, there is a good chance that the pen sensor 4 will mistakenly detect the color or brightness and therefore the accuracy of judgement will become poorer.

The means for preventing erroneous detection by the pen sensor 4 will be explained next with reference to FIG. 8B.

The area $b_{32}$ (green) is scanned and the color or brightness of the point P indicated by the pen sensor 4 is detected. Originally, however, the color shown by the area $b_{32}$ as a whole, here, green, should be detected, but assume that there is some abnormality on the screen 1 and green is not detected. This being the case, if a color other than green, it will be judged that the point P is located in an area other than the area $b_{32}$ despite being located in the area $b_{32}$. Further, the next scan area will be made the mistakenly judged area and its divided areas displayed at the next frame.

Therefore, the scan area of the pen sensor 4 is enlarged, for example, 5×5 dots worth of sensors of the light receiver 41 is are provided as illustrated, and sensors are arranged symmetrically at the top and bottom and at the left and right of the sensor corresponding to the black point B.

This being the case, the light receiver 41 detects the color or brightness of the area $b_{32}$ by the scan area of 5×5 dots, so even if there is an abnormal pixel or dirt in the scan area, the erroneous position will not be detected.

Figure 8B:
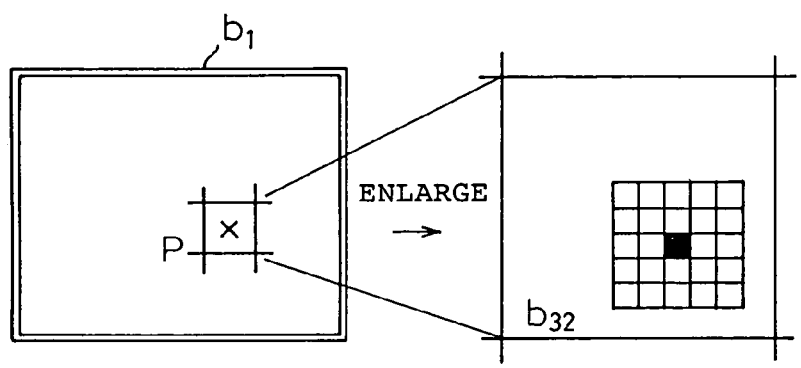

The case of the 5×5 dots shown in FIG. 8B is suitable when at the stage where the narrowing operation by division has not proceeded that far or when the abnormal pixel or dirt in the scan area is large, but the accuracy of judgement deteriorates when the scan area of the pen sensor 4 happens to straddle adjoining areas.

Figure 8C:
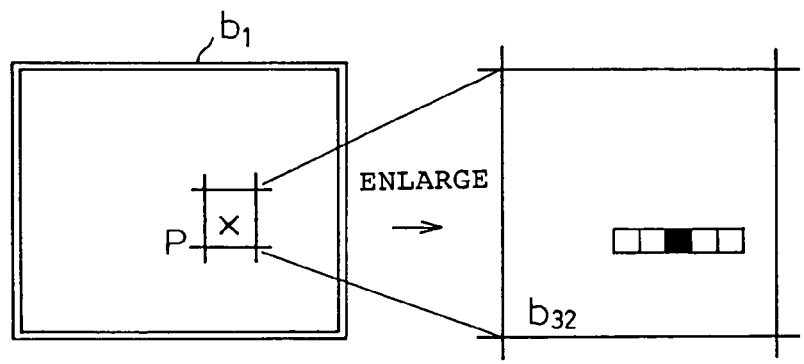

To deal with this, as shown in FIG. 8C, 1×5 dots worth of sensors of the light receiver 41 are provided. These are arranged at the top and bottom or to the left and right of a black dot for which the XY coordinate position is to be determined. In FIG. 8C, the case of arrangement to the left and right is shown.

When arranging the sensors to the left and right, when determining the Y-coordinate position, it is possible to detect the color or brightness by the left and right sensors and determine which area the scan area is in no matter if any dot is missing and without straddling vertically adjoining regions. Further, when determining the X-coordinate position, it is sufficient to arrange 1×5 dots worth of sensors. Further, if the 1×5 dots worth of sensors are made able to detect colors or brightnesses individually, it is possible to detect different colors or brightnesses of the 1×5 dots. When the scan area straddles the X-coordinate direction or Y-coordinate direction, it is possible to judge adjoining areas.

When using 1×5 dots worth of sensors, compared with when using 5×5 dots worth of sensors, the number of sensors used can be made smaller and the accuracy of judgement can be improved.

Next, the case of reducing the flickering of the display screen during the coordinate narrowing operation will be explained with reference to FIG. 9.

As shown in FIG. 4 to FIG. 7, if the screen is divided and this operation repeated to narrow down the area in which the point P is located in order to determine the coordinate position of the point P, as explained above, the narrowing time is short. If however the tip of the pen sensor 4 is moved on the screen before determination of the coordinate position of the point P, the narrowing operation would have to be redone and erroneous judgement would be induced. If this happens, the display screen will flicker in the narrowing process.

As a means to deal with this, the fact that the narrowing operation is underway is displayed with emphasis so as to notify the user on the emphasized display that movement of the pen sensor 4 is prohibited. FIG. 9 shows an example of this emphasized display.

The case is shown at the frame $e_1$ where the tip of the pen sensor 4 is in contact with the point P and the display screen is displayed divided into two by different colors or brightnesses. At this time, an arc is displayed using the boundary line of the different colors or brightnesses is displayed as a chord. This arc is made a color or brightness separate from the different colors or brightnesses displayed divided. The emphasis is not limited to an arc. It may also be a specific mark. The point is that it stand out.

Further, with each division and narrowing operation, arcs are displayed on the display screen as shown by the frames $e_2$ to $e_n$. This being so, the user learns that movement of the pen sensor 4 is prohibited while the arcs are being displayed and there is no movement of the pen sensor 4 until the coordinate position of the point P is determined.

Next, an explanation will be made, referring to FIG. 10 to FIG. 13, of the shortening of the time required for the narrowing operation by predicting the scan area of the second point on indicated by the pen sensor 4.

When using the pen sensor 4 as an input means and drawing a character on the display screen, drawing a line, drawing a figure, etc., the user has to indicate the second point on by the pen sensor 4 on the display screen. When drawing a character etc., the position on the display screen indicated for the second point on sometimes is close to the position of the relatively early first point. If narrowing the position from the entire screen for the second point on at such a time, narrowing time would be required and would be wasted.

Figure 10:
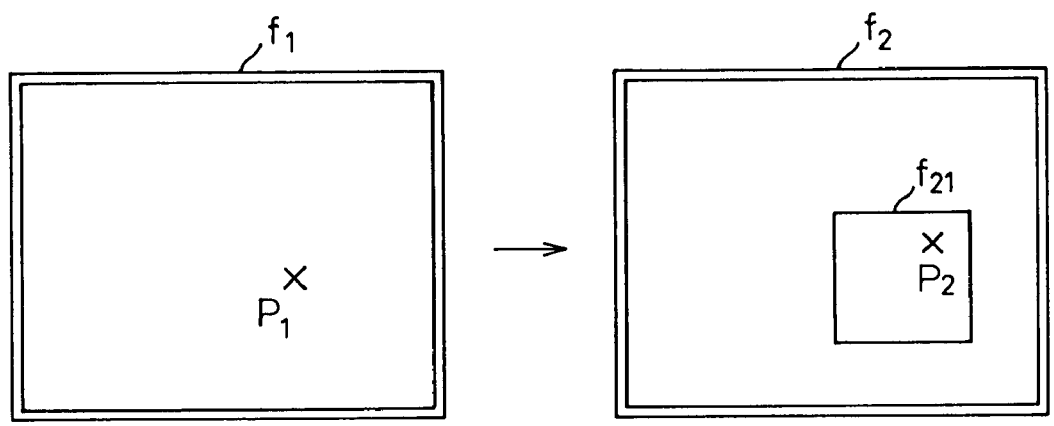
FIG. 10 is a schematic view use of the area surrounding a first point as a scan area of a second point.

Therefore, as shown in FIG. 10, after the coordinate position of the first point, that is, the point $P_1$, is determined at the frame $f_1$, the narrowing operation is started for determining the coordinate position of the second point $P_2$ at the frame $f_2$. For example, when inputting a word, the possibility of drawing all over the screen is low, so a predetermined range is set in advance and the area $f_{21}$ of that predetermined range centered around the point $P_1$ is displayed at the frame $f_2$ when the pen sensor 4 indicates the point $P_2$.

The determination of the coordinate position of the point $P_2$ is started from this area $f_{21}$. The coordinate narrowing routine may be performed by division by different colors or brightnesses or by movement of the boundary line.

Even if starting the narrowing operation from the area $f_{21}$, sometimes it the operation will be wrong. At this time, the operation is redone from the entire screen or from a range broader than the area $f_{21}$.

In FIG. 10, it was not known which direction the pen sensor 4 would move for the second point, but for example when drawing a figure etc., depending on the shape, if the position of the first point is determined, it is sometimes possible to roughly predict the direction of indication of the second point. When trying to input a square, for example, if the first point leans to the top right side of the screen, there is a high probability of the second point being in the bottom right direction.

Figure 11:
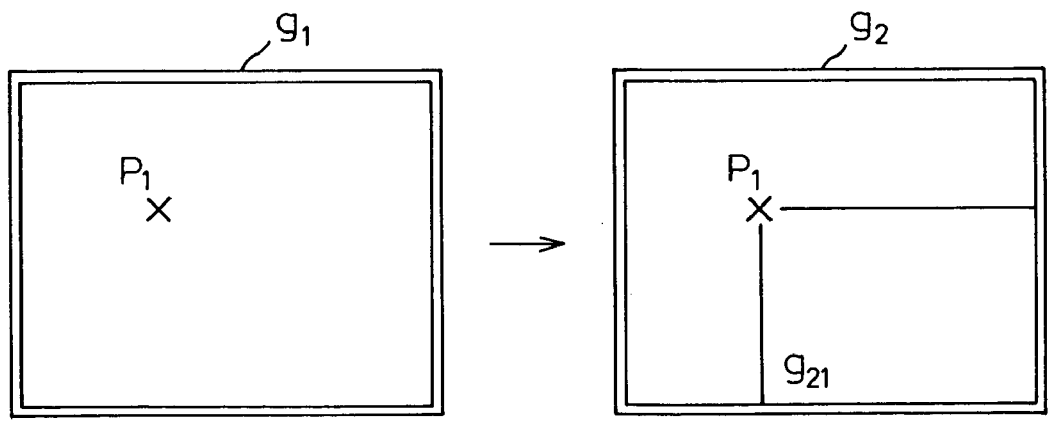
FIG. 11 is a schematic view of a scan area extending out from the position of a first point whose coordinates are determined.

Therefore, referring to FIG. 11, after determining the coordinate position of the first point $P_1$ at the frame $g_1$, the narrowing operation is started from the area $g_{21}$ having the point $P_1$ as the top left corner. The subsequent coordinate narrowing routine is similar to the case shown in FIG. 10.

Next, referring to FIG. 12, the explanation will be given of the shortening of the time required for the narrowing operation of the second point begun to be traced again when the coordinate position of the first point is determined, then the user happens to remove the pen sensor 4 from the screen in the middle of indicating positions while tracing a figure on the display screen by the pen sensor 4.

Assume that in the display screen 1, the tip of the pen sensor 4 is used to indicate the first point $P_1$ and traces a figure on the screen in the p direction from the point $P_1$ (solid line arrow). Here, while the user had planned to draw further from the point $P_2$, he or she ends up removing the tip of the pen sensor 4 from the screen at the point P (broken line arrow). This being the case, the user skips the space up to the point $P_2$ and starts tracing again from the point $P_2$. At this time, the narrowing operation of the coordinate position is begun again at the second point $P_2$, but the narrowing operation is started from the full screen, so time is taken until determination of the coordinates.

In such a case, by predicting the narrowing start area of the second point started to be traced again and reducing the narrowing area, the narrowing time is shortened.

Since the tracing is continued from the point $P_1$ on the screen up to the point p, the position of the point $P_2$ started to be traced again has a high probability of being on the extension shown by the solid line arrow. Therefore, the area A including the extension of the solid line arrow starting from the point p is selected and a predetermined range set. Here, the narrowing operation is started from the area A. The coordinate narrowing routine may be performed by division by color or brightness or by movement of the boundary line.

Due to this, it is not only possible to improve the accuracy of determination of the coordinations for the second point on, but it is also possible to reduce the flickering and shorten the time for determination of the coordinates at the time of erroneous operation.

Figure 12:
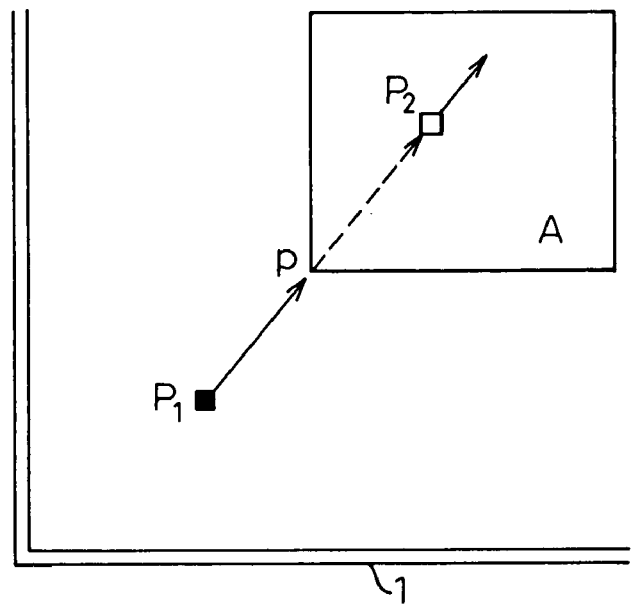
FIG. 12 is a schematic view of the case of performing a scan operation by predicting the scan area of a second point.

Further, in the case shown in FIG. 12, the coordinate narrowing start area A of the second point was set using the point p where the tip of the pen sensor 4 left the screen as the starting point, but the scan area can be predicted again by taking into consideration the direction of movement and speed of movement of the tip of the pen sensor before resuming tracing. Due to this, the coordinate narrowing time for the second point begun to be traced again is shortened.

Figure 13:
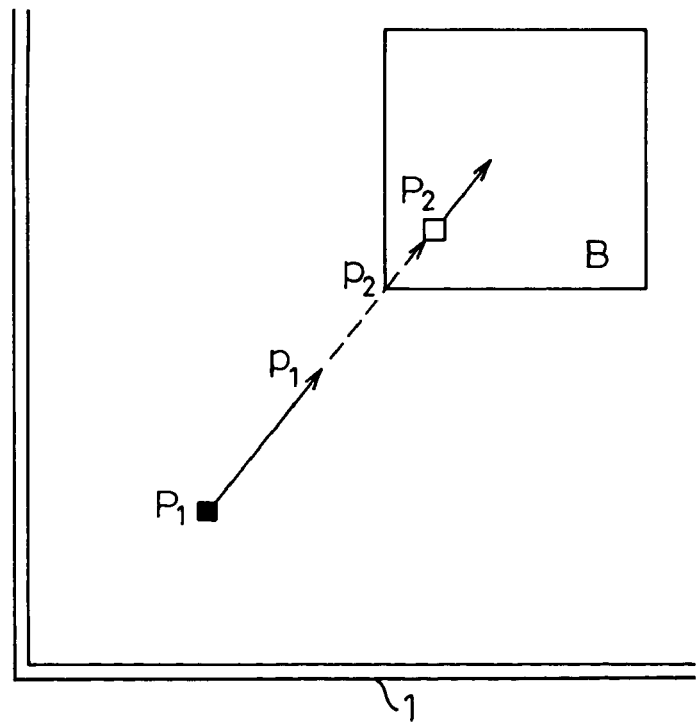
FIG. 13 is a schematic view of the case of performing a scan operation by predicting the scan area of a second point.

As shown in FIG. 13, when continuing to trace on the screen from the point $P_1$ to the point $p_1$ (solid line arrow), the tip of the pen sensor 4 ends up leaving the screen (broken line arrow) and the tracing is started again from the point $p_2$.

Therefore, based on the input results of the tracing starting from the point $P_1$ to the point $p_1$, the direction of the solid line arrow extending from the point $P_1$ (movement direction) and its length (movement speed) are calculated and the position of the point $P_2$ started to be traced again is predicted. In this prediction, for example sometimes the shape is determined such as with a specific graphic, so it is possible to set the extent of this in advance and to select the area B having as a starting point the point $p_2$ ahead of the point $p_1$ where the tip of the pen sensor 4 left the screen. Further, the coordinate position of the point $P_2$ is determined using the area B is the narrowing start area.

Due to this, it is possible to increase the speed of determination of coordinates at the time of erroneous operation.

Note that as shown in FIG. 12 and FIG. 13, the scan areas will be displayed envisioning the case where the tracing is started from the point $P_1$, the tip of the pen sensor 4 is moved away from the screen once in the middle of the process, then the tracing is begun again from the point $P_2$. Once the tip of the pen sensor 4 moved away from the screen, however, it cannot be judged if the scan operation has been ended or if tracing will be started again after this. Therefore, a certain time is awaited from the time when the tip of the pen sensor 4 leaves the screen once. If a scan start signal is input in that time, it is considered that the tracing is started continuing from this and it is sufficient to display the scan area. On the other hand, if no scan start signal is input even after the elapse of the constant time, it is considered that the scan operation has ended and the display of the scan area is stopped.

Next, when it is necessary to designate the second point on while the pen sensor 4 is tracing on the screen, after the coordinate position of the first point is determined, the surrounding area of the coordinate position is divided across different directions and different colors and brightnesses are displayed for the scan. By this, the fact of movement of the pen sensor 4 and the direction of movement are detected.

Figure 14:
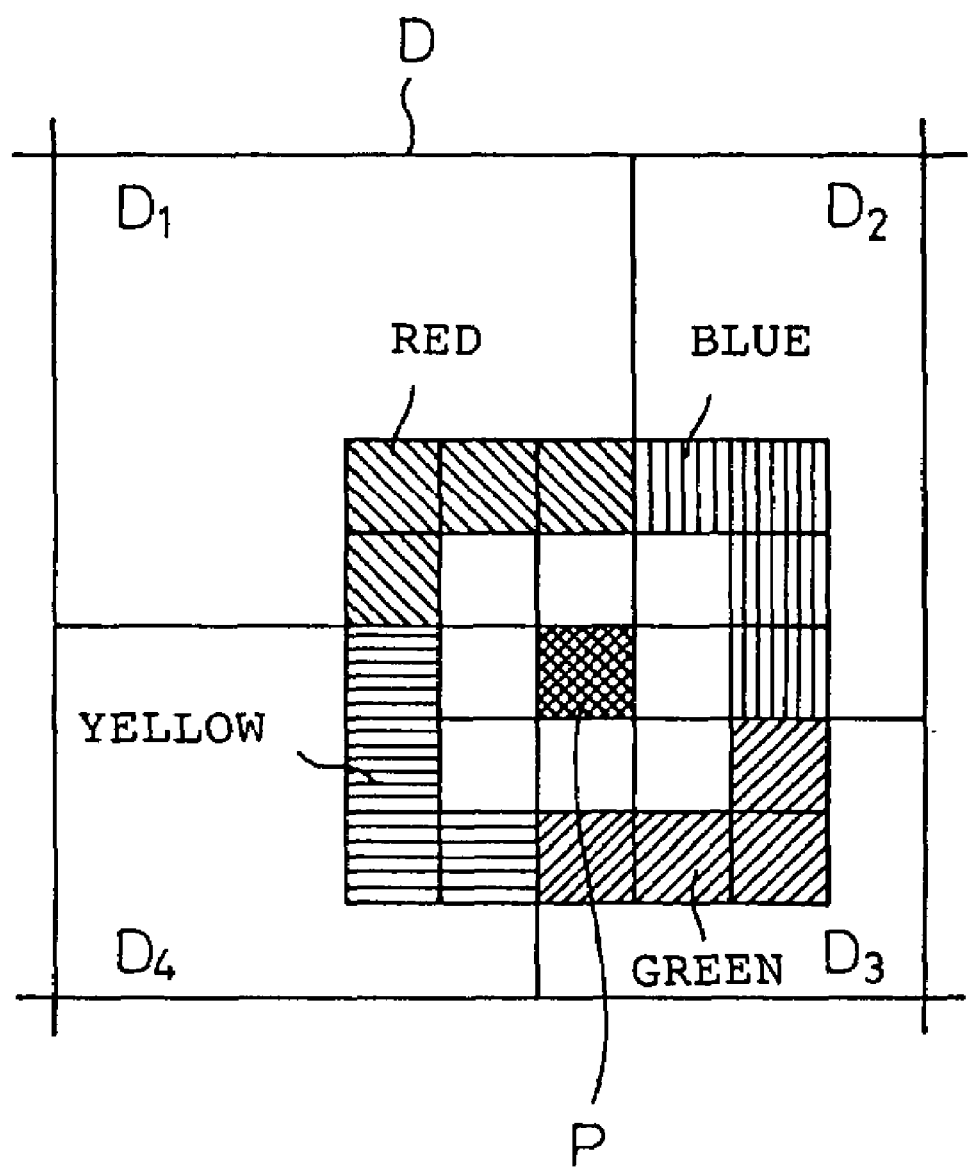
FIG. 14 is a schematic view of the case of detecting movement of a pen sensor.

FIG. 14 shows a display screen for detection of movement. In the figure, after the coordinate position of the point P (black dot) is determined in the area D in the middle of the narrowing operation, the movement detection area of the 5×5 dots including the point P are displayed. Centering around the point D, the area D is divided into four regions $D_1$ to $D_4$. The group of the four dots at the outside of the movement detection areas belonging to the areas $D_1$ to $D_4$ differ in color and brightness displayed in the area D. Further, the colors or brightnesses are selected to be different from each other. The dots inside of the movement detection area have the colors or brightnesses of the D area. Some margin is given for when the pen sensor 4 moves slightly.

Here, if the tip of the pen sensor 4 moves, it will move through one of the dots at the outside of the movement detection area. At that time, the light receiver 41 detects the red color, it is learned that the point P is heading in the direction of the area $D_1$.

Note that in FIG. 14, four types of colors or brightnesses of dots at the contours of the movement detection area were used, but by making these different for each dot, it is possible to further improve the detection accuracy of the pen sensor 4 in the movement direction.

Further, the contour was formed at the outer periphery of the movement detection area, but it is also possible to make all of the dots in the movement detection area respectively different colors or brightnesses.

This is effective when predicting the direction of movement as in the case shown in FIG. 13. The determination of the coordinates of the second point on can be simplified.

Figure 15:
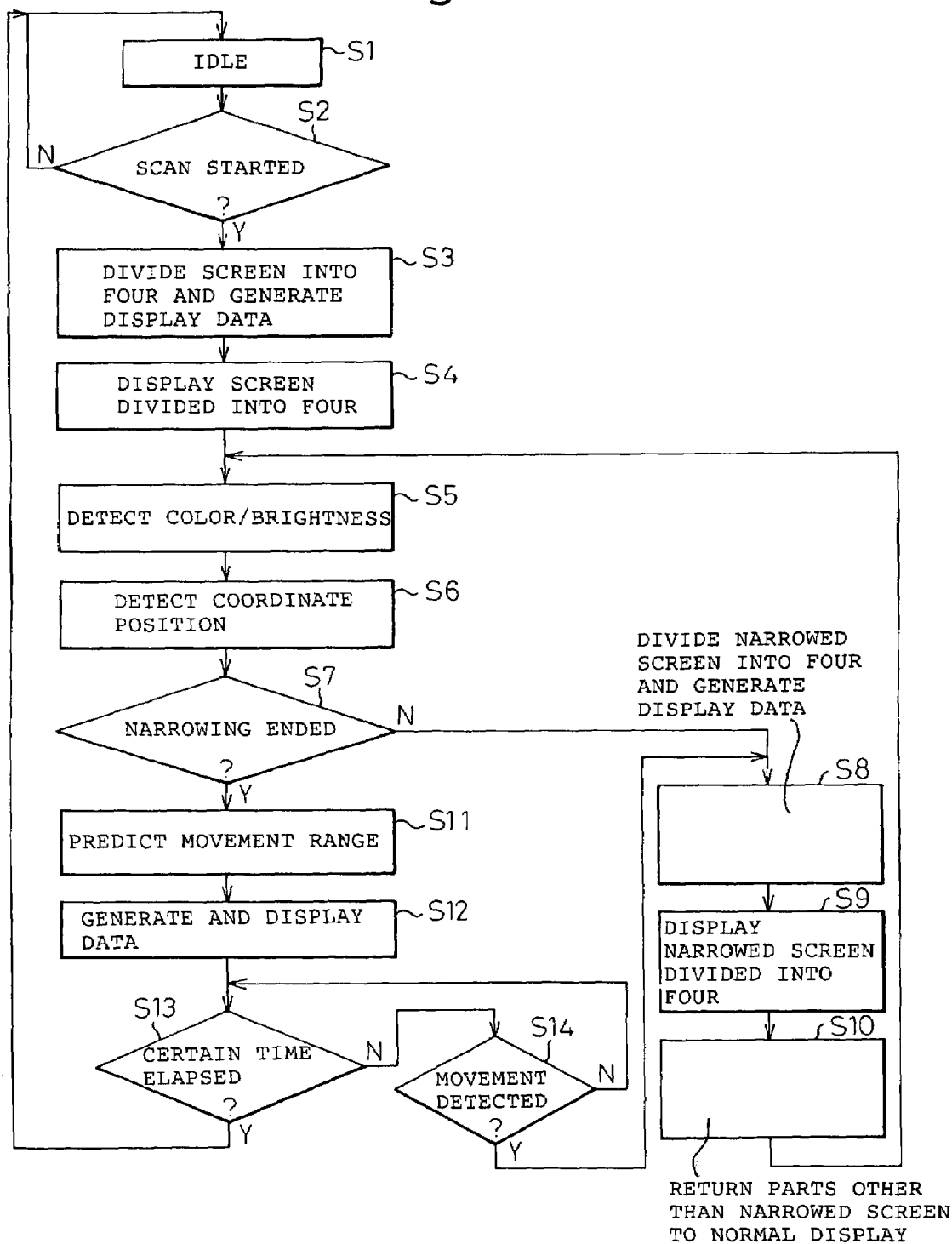
FIG. 15 is a flow chart for explaining a scan operation by a pen sensor.
Figure 16:
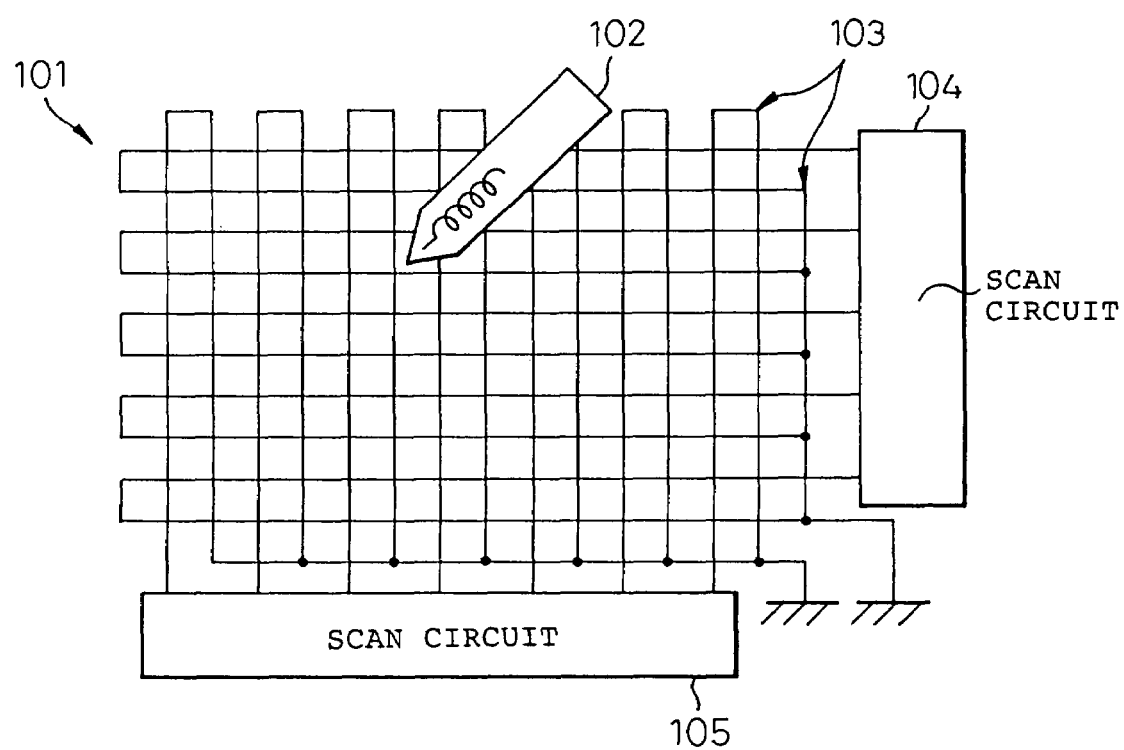
FIG. 16 is a schematic view of the configuration of a tablet.
Figure 17:
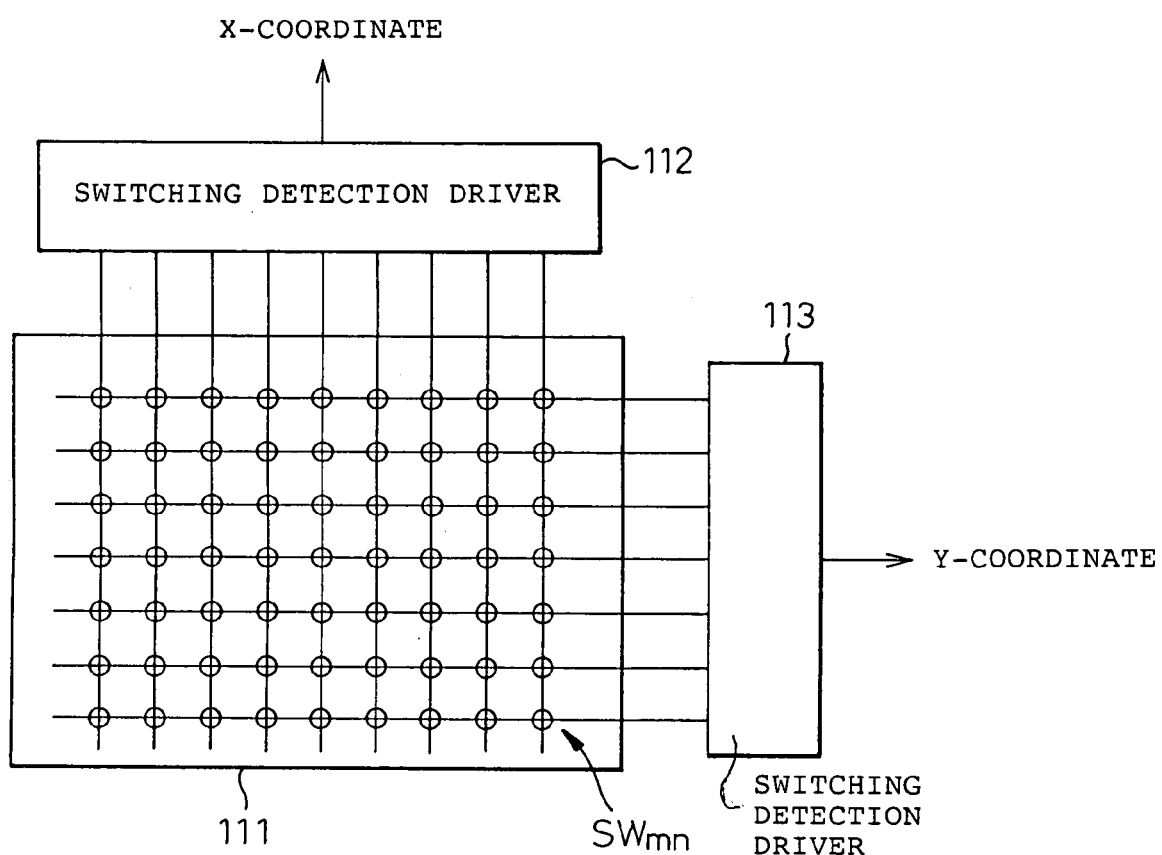
FIG. 17 is a schematic view of the configuration of a touch panel.

Up to here, the explanation was given of the determination of the X-coordinate and Y-coordinate positions of a point indicated by the tip of the pen sensor 4 with reference to FIG. 4 to FIG. 14. Next, an explanation will be given, referring to the flow chart of FIG. 15, for the case of dividing a screen into four to determine the coordinate position for the operation of the control system apparatus 3 and pen sensor 4 shown in FIG. 1 and FIG. 3.

The display screen 1 of the display device 2 displays a normal screen. Therefore, when inputting for example a word, figure, etc. to the display screen 1 using the pen sensor 4, the tip of the pen sensor 4 is brought into contact with the screen 1. This being done, the light receiver 41 at the tip of the pen sensor 4 detects the color or brightness of the display screen at the contacted position. The detected signal is processed by the RGB filter 42, photoelectric converter 43, and A/D converter 44 and transmitted to the scan data generator 45. The scan data generator 45, however, generates the scan data based on the signals detected by the light receiver 41, including the signals detected by the pressure sensor 47 and slant sensor 48. It is not known if this data is necessary for the operation for determination of the coordinate position. Therefore, for example, when the user inputs the start from the scan start signal generator 46 comprised of the switches provided at the pen sensor 4, the start signal is included in the scan data, then the scan data generator 45 transmits the detected scan data to the control system device through the interface converter 49. Alternatively, it is possible to transmit the scan data to the control system device 3 only when the start signal is input.

In the control system device 3, the operation for determination of the coordinate position is in the idle state until scan data is received (step S1).

Next, when receiving the scan data, it is judged if the received scan data is one for which determination of the coordinates is necessary (step S3). When not starting the scan (N), even if the light receiver 41 detects light or brightness, this is considered to not be necessary for determination of the coordinate position and the device returns to the idle state of step S1, while when starting the scan (Y), the scan data receiver transmits the received scan data to the coordinate position detector 33.

The coordinate position detector 33, when receiving the scan data, instructs the division conditions of the display screen set in advance to the display data generator 35. The display data generator 35 generates the display data obtained by dividing the screen as a whole into four (step S3).

The display data generator 35 supplies the generated display data to the display device. The display screen 1 displays the frame $b_2$ as shown in FIG. 5 (step S4).

Next, the light receiver 41 of the pen sensor 4 detects the color or brightness of the point P. At this time, the scan data detected by the light receiver 41 includes the blue color (step S5).

The scan data including the blue color is sent to the coordinate position detector 33. This refers to the display data of the display data generator 35 and detects that the point P is inside the area $b_{23}$ (step S6).

Here, it is judged if the area $b_{23}$ is the final narrowed area of the point P (step S7). With the size of the area $b_{23}$, however, the coordinate position of the point P is not determined (N), so the coordinate position detector 33 instructs the display data generator 35 to further divide the narrowed down screen, that is, the area $b_{23}$, in the next frame $b_3$. The display data generator 35 generates the display data at the area $b_{23}$ (step S8). At this time, display data is generated displaying also a circle etc. indicating that the narrowing operation is underway so as to surround the area $b_{23}$.

The display data for the generated area $b_{23}$ is displayed at the frame $b_3$ of the display screen 1 (step S9).

In the screen of the displayed frame $b_3$, however, the areas other than the area $b_{23}$ are displayed by the color of the frame $b_2$, so the areas other than the narrowed down area is returned to the state of display of the normal display screen, that is, the frame $b_1$ (step S10). This step S10, however, is performed simultaneously with the display of the frame $b_3$ of step S9.

When the area $b_{23}$ is displayed, the light receiver 41 of the pen sensor 4 then detects the green color and supplies the scan data including this green data to the coordinate position detector 33 (step S5).

The coordinate position detector 33 judges that the point P is located in the area $b_{32}$ from the scan data including the green color and the display data of the frame $b_3$ (step S6).

Here, if the coordinate position of the point P is determined, a narrowing operation using four-way division is performed at the next frame. The process from step S5 to step S10 is repeated until the final narrowed down screen. Once the coordinate position of the point P can be determined, the narrowing operation ends (Y at step S7).

In the above explanation of operation, the case of narrowing by four-way division was shown, but the narrowing operation is similar to the routine of the flow chart shown in FIG. 8 even when adopting narrowing using division other than four-way division.

Further, the flow chart when determining the position of the X-coordinate or Y-coordinate by movement of the boundary line of the different colors or brightnesses becomes simpler than that of FIG. 8. That is, at steps S3 and S4, the display data of movement of the boundary line of different colors or brightnesses is generated, while at steps S5 and S6, the position where the light receiver 41 detects a change of the color or brightness is made the X-coordinate or Y-coordinate position. Further, when using movement of the boundary line of the different colors or brightness for both of the X-coordinate and Y-coordinate, at steps S8 to S10, display data of movement of the boundary line of different colors or brightnesses may be generated for the other non-determined coordinate, while at step S5 and S6, the position where the light receiver 41 detected a change of the color or brightness may be determined as the other coordinate position. This ends the narrowing operation.

The above ends the determination of the coordinate position of the point P in the frame $b_1$ in FIG. 5 (Y in step S7), but this point P is for example the starting point for input for drawing a word, graphic, etc. When continuing to draw etc., the user moves the tip of the pen sensor 4 from the starting point P while in contact with the screen. Each time the tip moves, the coordinate position of the point P is determined. Here, at step S11, the next movement of the point P is predicted.

The predication of the scan area for determination of the coordinate position of the second point may be performed by selecting the scan area by the various methods shown in FIG. 10 to FIG. 13. To display the selected scan area on the display screen, the display data generator 35 generates display data which it then displays on the display screen 1 (step S12).

When indicating only the starting point P and immediately moving the tip away or when not moving from the point P and continuing to indicate only the point P, however, it is not necessary to newly determine the coordinate position. Therefore, exactly a predetermined time is awaited for judging whether a scan start signal is supplied after the end of the narrowing operation for the point P as well (step S13).

Therefore, before the elapse of the predetermined time (N), there is a possibility of the tip of the pen sensor 4 starting to trace a figure on the display screen, so it is judged whether movement of the point P has been detected (step S14). The movement is detected, as shown in FIG. 14, by displaying a plurality of dots of different colors or brightnesses around the point P.

When movement of the point P is not detected (N), the routine returns to step S13 and the elapse of a predetermined time is awaited. Further, when movement of the point P is detected (Y), the narrowing operation using four-way division is performed from the frame $b_2$ shown in FIG. 5 for the operation for determination of the coordinate position at the movement point $P_1$ next after the point P (step S8). Further, the process from step S5 to step S10 is repeated to determine the coordinate position of the moved point P1.

In this way, the process from step S5 to step S14 is repeated every time the point $P_n$ moves.

On the other hand, when the predetermined time has elapsed at step S13 (Y), there is no movement of the point P and the point P is indicated alone or it is assumed that the scan has ended, the routine returns to step S1, and the operation for determination of the coordinate position is placed in the idle state.

In addition to the narrowing operation for a point indicated by the pen sensor 4 explained above, the determination of the coordinates of the point may be improved in accuracy or simplified.

To improve the accuracy of the determination of the coordinate position of a point indicated by the pen sensor 4, before the operation for scanning the display screen by the pen sensor 4, the user scans a number of points to obtain the effect of narrowing for those points. Then, the coordinates of the results of the narrowing operation and the actual XY coordinates of the number of points are compared. Then the error can be found and the coordinates obtained as a result of the subsequent narrowing operation corrected.

Further, when drawing a character, figure, or other element, if there is an existing standard element in any range of the point indicated by the pen sensor 4, the point connected with that element ends up being treated as the point indicated by the pen sensor 4. For example, if one point is indicated by the pen sensor 4 somewhere such as when drawing of a standard square is input, it is possible to determine the existing element, so even if the pen sensor 4 is used to indicate the second point, the point of the existing element is treated as the point indicated by the pen sensor 4.

Further, when drawing a character, figure, or other standard element, if there is an existing standard element in any range near the point at which the pen sensor 4 indicates the end of the scan, the point connected with that element is made the scan end point.

As explained above, according to the present invention, a pen sensor detecting a color or brightness of a coordinate position on a display screen of a display device is used, the display screen is successively divided into a plurality of areas, and the displayed colors or brightnesses are detected by the pen sensor so as to narrow down the position of a point indicated by the pen sensor and determine the coordinates of that point, so addition of the function to existing hardware is easy, the reliability is high, visibility is not impaired, and a coordinate position can be determined with a high accuracy at a low cost.

The invention claimed is:

1. A pen sensor coordinate narrowing method for determining a position indicated by a pen sensor when scanning a display screen by said pen sensor, said pen sensor coordinate narrowing method comprising:

dividing said display screen into two areas when starting to scan said display screen by said pen sensor;

displaying the two areas by respective, different colors or brightnesses as a first display, and in the first display, continuously moving a boundary line formed by the two areas along a vertical axis or a horizontal axis of said display screen, and from an edge of said display screen in a direction perpendicular to the boundary line, thereby increasing a size of one of the two areas while decreasing a size of another of the two areas;

detecting a change of color or brightness along movement of the boundary line with the pen sensor, and determining a horizontal coordinate or a vertical coordinate of a position indicated by the pen sensor on the display screen based on the change detected by the pen sensor;

further dividing said display screen into a plurality of areas along the vertical axis or the horizontal axis of the display screen as a next scan area, and displaying the plurality of areas by respective, mutually different colors or brightnesses as a second display; and judging which of the plurality of areas the position of the pen sensor on the display screen is at, based on a single color or brightness of the areas detected by the pen sensor, wherein;

the judged area is used as a next scan area, and the second displaying and the judging are repeated several times so as to determine the horizontal coordinates or the vertical coordinates of the first position indicated by the pen sensor.

2. A pen sensor coordinate narrowing method as set forth in claim 1, further comprising:

predicting a range including a second position which said pen sensor will indicate next, after the coordinates of the first position on said display screen indicated by the pen sensor are determined; and using the predicted range as the next scan area.

3. A pen sensor coordinate narrowing method as set forth in claim 2, wherein the range including the second position predicted is a range including the periphery of the first position.

4. A pen sensor coordinate narrowing method as set forth in claim 2, further comprising using the coordinates of the first position as a starting point and using a range extended toward one corner of the screen as the next scan area.

5. A pen sensor coordinate narrowing method as set forth in claim 2, further comprising using the point where the pen sensor is moved away from the screen as the starting point, predicting the range including a second position next indicated by said pen sensor, and using that range as said next scan area when said pen sensor moves from said first position on said screen.

6. A pen sensor coordinate narrowing method as set forth in claim 2, further comprising computing a direction of movement and speed of movement from said first position based on information up to the point where the pen sensor is moved away from the screen, predicting a position in proximity to said second position, and using the range predicted to include that second position using that proximity position as a starting point as said scan area.

7. A pen sensor coordinate narrowing method as set forth in claim 1, further comprising comparing a color or brightness detected at a position indicated by said pen sensor and a color or brightness displayed on said screen around the position indicated by said pen sensor to prevent erroneous judgment of the coordinates of the pen sensor.

8. A pen sensor coordinate narrowing method as set forth in claim 1, further comprising, after the coordinates of said first position on said screen have been determined, surrounding said first position as a movement detection area, displaying a plurality of areas included in that area by mutually differing colors or brightnesses, and judging that said pen sensor has moved when said pen sensor detects a color or brightness which is different from the color or brightness of said first position.

9. A pen sensor coordinate narrowing method as set forth in claim 1, further comprising displaying emphasis on the display screen indicating that a narrowing operation is underway at said display step.

10. A pen sensor coordinate narrowing method as set forth in claim 1, further comprising considering the scan operation to have ended when the pen sensor is moved away from the screen for a predetermined time.

11. A pen sensor coordinate narrowing apparatus for determining a position on a display screen, which is indicated by a pen sensor, comprising:

a moving unit dividing said display screen into two areas when starting to scan said display screen by said pen sensor, displaying the two areas by respective, different colors or brightnesses as a first display, and in the first display, continuously moving a boundary line formed by the two areas along a coordinate axis of said display screen, and from an edge of said display screen in a direction perpendicular to the boundary line, thereby increasing a size of one of the two areas while decreasing a size of another of the two areas;

a determining unit detecting a change of color or brightness along movement of the boundary line with the pen sensor, and determining a position of said coordinate axis based on the change of color or brightness detected by said pen sensor;

a display unit dividing said display screen into a plurality of areas in a direction perpendicular to said coordinate axis of the display screen as a next scan area, and displaying the plurality of areas by respective, mutually different colors or brightnesses, as a second display;

a position detecting unit determining the divided area including said position indicated by said pen sensor based on the color or brightness detected by said pen sensor; and a control unit repeatedly instructing said display unit to use said divided area determined by said position detecting unit as the next scan area, divide it into a plurality of areas in a direction perpendicular to said coordinate axis of the display screen, and display the areas by respective different colors or brightnesses, and in each case instructing said position detecting unit to determine the divided area including said position, wherein when the displaying as a second display and the determining are repeated several times, a coordinate of a coordinate axis perpendicular to said coordinate axis, on the first position indicated by the pen sensor, is determined.

12. A pen sensor coordinate narrowing apparatus as set forth in claim 11, further comprising a first sensor for detecting a color or brightness on said screen at a position indicated by said pen sensor and a plurality of second sensors arranged symmetrically with respect to said first sensor.

13. A pen sensor coordinate narrowing apparatus as set forth in claim 11, wherein said display unit, after the coordinates of said first position on said display screen have been determined, displays a movement detection area surrounding said first position and comprised of different colors or brightnesses, and said position detecting unit detects movement or direction of movement of said pen sensor when said pen sensor detects the colors or brightnesses of said movement detection area.

14. A pen sensor coordinate narrowing apparatus as set forth in claim 13, wherein said movement detection area forms a contoured part including the range of the first position.

15. A pen sensor coordinate narrowing apparatus as set forth in claim 11, wherein said display unit stops the display of said scan area when there is no instruction for display of the next scan area even after the elapse of a predetermined time from the display of said scan area.

16. A pen sensor coordinate narrowing apparatus as set forth in claim 11, wherein said display unit displaying emphasis on the display screen indicating that a narrowing operation is underway.

17. A pen sensor coordinate narrowing apparatus for determining a position indicated by a pen sensor, comprising:

a moving unit dividing a display screen into two areas when starting to scan said display screen by said pen sensor, displaying the two areas by respective, different colors or brightnesses as a first display, and in the first display, continuously moving a boundary line formed by the two areas along a coordinate axis of said display screen from an edge of said display screen in a direction perpendicular to the boundary line, thereby increasing a size of one of the two areas while decreasing a size of another of the two areas;

a determining unit detecting a change of color or brightness along movement of the boundary line with the pen sensor, and determining a position of said coordinate axis based on the change of color or brightness detected by said pen sensor;

a display unit dividing said display screen into a plurality of areas in a direction perpendicular to said coordinate axis of the display screen as a next scan area, and displaying areas by respective different colors or brightnesses as a second display;

a colors or brightnesses detecting unit detecting colors or brightnesses of said areas displayed on said display screen, using the pen sensor;

a position detecting unit determining the divided area including the position indicated by said pen sensor based on the color or brightness detected by the colors or brightnesses detecting unit;

a control unit repeatedly instructing said display unit to use said divided area determined by said position detecting unit as the next scan area, divide it into a plurality of areas in a direction perpendicular to said coordinate axis of the display screen, and display the areas by respective different colors or brightnesses, has and in each case, instructing said position detecting unit to determine the divided area including said position; and a movement range predicting unit predicting a range including a second position which said pen sensor will indicate next after the coordinates of the first position on the screen, indicated by the pen sensor, are determined, and using the predicted range as the next scan area to determine the second position, wherein said display unit divides said next scan area into a plurality of areas and displays said plurality of areas by respective, different colors or brightnesses.

18. A pen sensor coordinate narrowing apparatus as set forth in claim 17, wherein said movement range predicting unit uses the range including the periphery of the first position as the next scan area.

19. A pen sensor coordinate narrowing apparatus as set forth in claim 17, wherein said movement range predicting unit uses as said next scan area an area extending toward one corner of said screen using the coordinates of said first position as a starting point.

20. A pen sensor coordinate narrowing apparatus as set forth in claim 17, wherein said movement range predicting unit uses as said next scan area the range predicted to include a second position to be next indicated by said pen sensor point using as a starting point the point where the pen sensor moves over said screen from said first position and said pen sensor is moved away from the screen.

21. A pen sensor coordinate narrowing apparatus as set forth in claim 17, wherein said movement range predicting unit computes a direction of movement and speed of movement from said first position based on information up to the point where the pen sensor is moved away from the screen, predicts a position in proximity to said second position, and uses the range predicted to include that second position using that proximity position as a starting point as said scan area.

* * * * *